(12) United States Patent
Funk et al.

(10) Patent No.: US 6,493,715 B1
(45) Date of Patent: Dec. 10, 2002

(54) DELIVERY OF CONFIGURATION CHANGE IN A GROUP

(75) Inventors: Mark Robert Funk, Mantorville, MN (US); Gera Goft, Karkur (IL); Dimitry Kloper, Haifa (IL); Shlomit Pinter, Haifa (IL); Esther Yeger-Lotem, Mizpe Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,177

(22) Filed: Jan. 12, 2000

(51) Int. Cl.[7] .............................................. G06F 17/30
(52) U.S. Cl. ..................................... 707/10; 707/103 R
(58) Field of Search ............................... 707/10, 103 R, 707/104.1, 8; 709/227; 370/466

(56) References Cited

U.S. PATENT DOCUMENTS 6,047,323 A * 4/2000 Krause ....................... 709/227

6,317,438 B1 * 11/2001 Trebes, Jr. .................. 370/466

OTHER PUBLICATIONS www.cs.cornell.edu/Info/Projects/Ensemble/Maestro (Maestro Open Toolkit: Group Member), pp. 1–4.
Goft, Gera et al., "The AS/400 Cluster Enginer: A Case Study", The International Group Communications Conference 99 (Aizu, Japan), pp. 1–6.
*Ensemble Reference Manual*, Hayden, Cornell Univ., 1997, Section 5, pp. 19–22.

* cited by examiner

*Primary Examiner*—Diane D. Mizrahi
(74) *Attorney, Agent, or Firm*—Darby & Darby

(57) ABSTRACT

A method for controlling operation of a computer software application running on a plurality of computing entities, which are members of a group of mutually-linked computing entities running the application within a distributed computing system. The method includes receiving an indication of a change in membership of the group together with a reason for the change. A membership change message is delivered to the members, so as to inform the members of the change and of the reason for the change.

26 Claims, 2 Drawing Sheets

US 6,493,715 B1

DELIVERY OF CONFIGURATION CHANGE IN A GROUP

FIELD OF THE INVENTION

The present invention relates generally to distributed computing systems, and specifically to treatment of configuration changes in clusters used in distributed computing applications.

BACKGROUND OF THE INVENTION

Computer clusters are widely used to enable high availability of computing resources, coupled with the possibility of horizontal growth, at reduced cost by comparison with collections of independent systems. Clustering is also useful in disaster recovery. A wide range of clustering solutions are currently available, including 390 Sysplex, RS/6000 SP, HACMP, PC Netfinity and AS/400 Cluster, all offered by IBM Corporation, as well as Tandem Himalaya, Hewlett-Packard Mission Critical Server, Compaq TruCluster, Microsoft MSCS, NCR LifeKeeper and Sun Microsystems Project Cascade. An AS/400 Cluster, for example, supports up to 128 computing nodes, connected via any Internet Protocol (IP) network. A developer of a software application can define and use groups of physical computing entities (such as computing nodes or other devices) or logical computing entities (such as files or processes) to run the application within the cluster environment. In the context of the present patent application and in the claims, such entities are also referred to as group members, and the term "entity" is used to refer interchangeably to physical and logical computing entities.

Distributed group communication systems (GCSS) enable applications to exchange messages within groups of cluster entities in a reliable, ordered manner. For example, the OS/400 operating system kernel for the above-mentioned AS/400 Cluster includes a GCS in the form of middleware for use by cluster applications. This GCS is described in an article by Goft et al., entitled "The AS/400 Cluster Engine: A Case Study," presented at the International Group Communications Conference IGCC 99 (Aizu, Japan, 1999), which is incorporated herein by reference. The GCS ensures that if a message addressed to the entire group is delivered to one of the group members, the message will also be delivered to all other live and connected members of the group, so that group members can act upon received messages and remain consistent with one another. A group member is considered to be "alive" if it is functioning and able to perform a part in a distributed software application. Typically, "liveness" testing procedures are defined and applied by the GCS to determine which members are alive and which are not.

Another well-known GCS is "Ensemble," which was developed at Cornell University, as were its predecessors, "ISIS" and "Horus." Ensemble is described in the "Ensemble Reference Manual," by Hayden (Cornell University, 1997), which is incorporated herein by reference.

A key function of the GCS is to inform software applications running on the computing group of the identities of the connected set of members in the group. Whenever the group configuration changes, due to one or more members leaving the group or new members joining, the GCS sends out a membership change message with a current, updated membership list. For example, the Ensemble system uses a class called Maestro_GroupMember, described at www.cs.cornell.edu/Info/Projects/Ensemble/Maestro/groud.htm to manage and distribute membership change messages. In this Ensemble class and in other systems known in the art, the form of the membership change message is the same whether the departing members have left the group voluntarily or due to a fault, such as a node crash or network failure. Similarly, such membership change messages contain no information as to the state of new group members and whether or not the new members have been members of this group in the past.

SUMMARY OF THE INVENTION

It is an object of some aspects of the present invention to provide improved methods and systems for enabling computer applications running on a cluster of participating entities to deal with membership changes in the cluster.

In preferred embodiments of the present invention, a group communication system (GCS), for use within a group of clustered computing entities, provides membership change messages to software applications running in the group. These messages not only identify which members have joined or left the group, but also indicate the reasons for the membership change. The reasons are typically gleaned by the GCS from various sources, such as network communication and topology layers, information provided by the members who join or leave the group, and diagnostics and control components of the GCS itself. Knowing the reasons for membership changes can be of crucial importance to many distributed applications, and particularly to cluster applications, such as database and cluster management applications, which must maintain a common state or require consistency among the group members.

Although preferred embodiments described herein are based on a GCS, it will be appreciated that the principles of the present invention may similarly be implemented in substantially any distributed computing environment in which there is a mechanism for keeping track of membership of entities in a computing group or cluster. As noted above, such entities may comprise either physical or logical entities.

There is therefore provided, in accordance with a preferred embodiment of the present invention, a method for controlling operation of a computer software application running on a plurality of computing entities, which are members of a group of mutually-linked computing entities running the application within a distributed computing system, the method including:

receiving an indication of a change in membership of the group together with a reason for the change; and delivering a membership change message to the members, so as to inform the members of the change and of the reason for the change.

Preferably, the indication is received by group communication system middleware, which delivers the membership change message to the members. Further preferably, receiving the indication of the change includes detecting a failure of the group communication system at a node in the distributed computing system.

Additionally or alternatively, receiving the indication of the change includes discovering a topology change in the distributed computing system, wherein discovering the topology change includes detecting a node in the system that has become available to run the application in the group. Preferably, detecting the node that has become available includes determining whether or not the node was previously separated from the group, and delivering the message includes informing the members as to whether or not the node previously belonged to the group.

Further additionally or alternatively, receiving the indication includes receiving notice of a communication failure in a network linking the computing entities or receiving notice of a failure of a node in the distributed computing system. Preferably, receiving the notice of the failure of the node includes receiving a report of a failure in a liveness check of the node.

Still further additionally or alternatively, receiving the indication includes receiving notice that a new member has joined the group or that one of the members has left the group voluntarily. Preferably, delivering the membership change message includes notifying the other members that the one of the members has left the group voluntarily.

Yet further additionally or alternatively, delivering the membership change message includes notifying the members that one or more members have left the group due to a specified failure in the system or that one or more members, previously separated from the group, have re-merged with the group.

Preferably, delivering the membership change message includes delivering substantially the same message to all of the members of the group, wherein substantially all of the members respond to the message in a mutually-consistent fashion.

There is also provided, in accordance with a preferred embodiment of the present invention, distributed computing apparatus, including:

a computer network; and a group of computer nodes, mutually-linked by the network so as to run a computer software application, and adapted so that responsive to an indication received at one of the nodes of a change in membership of the group, a membership change message is delivered to the members via the network, informing the members of the change and of a reason for the change.

There is further provided, in accordance with a preferred embodiment of the present invention, a computer software product for controlling operation of an application running on a plurality of computing entities, which are members of a group of mutually-linked computing entities running the application within a distributed computing system, the product including a computer-readable medium in which computer program instructions are stored, which instructions, when read by the computing entities, cause at least one of the entities to receive an indication of a change in membership of the group together with a reason for the change, and to deliver a membership change message to the members, so as to inform the members of the change and of the reason for the change.

The present invention will be more fully understood from the following detailed description of the preferred embodiments thereof, taken together with the drawings in which:

DETAILED DESCRIPTION OF PREFERRED EMBODIMENTS

Figure 1:
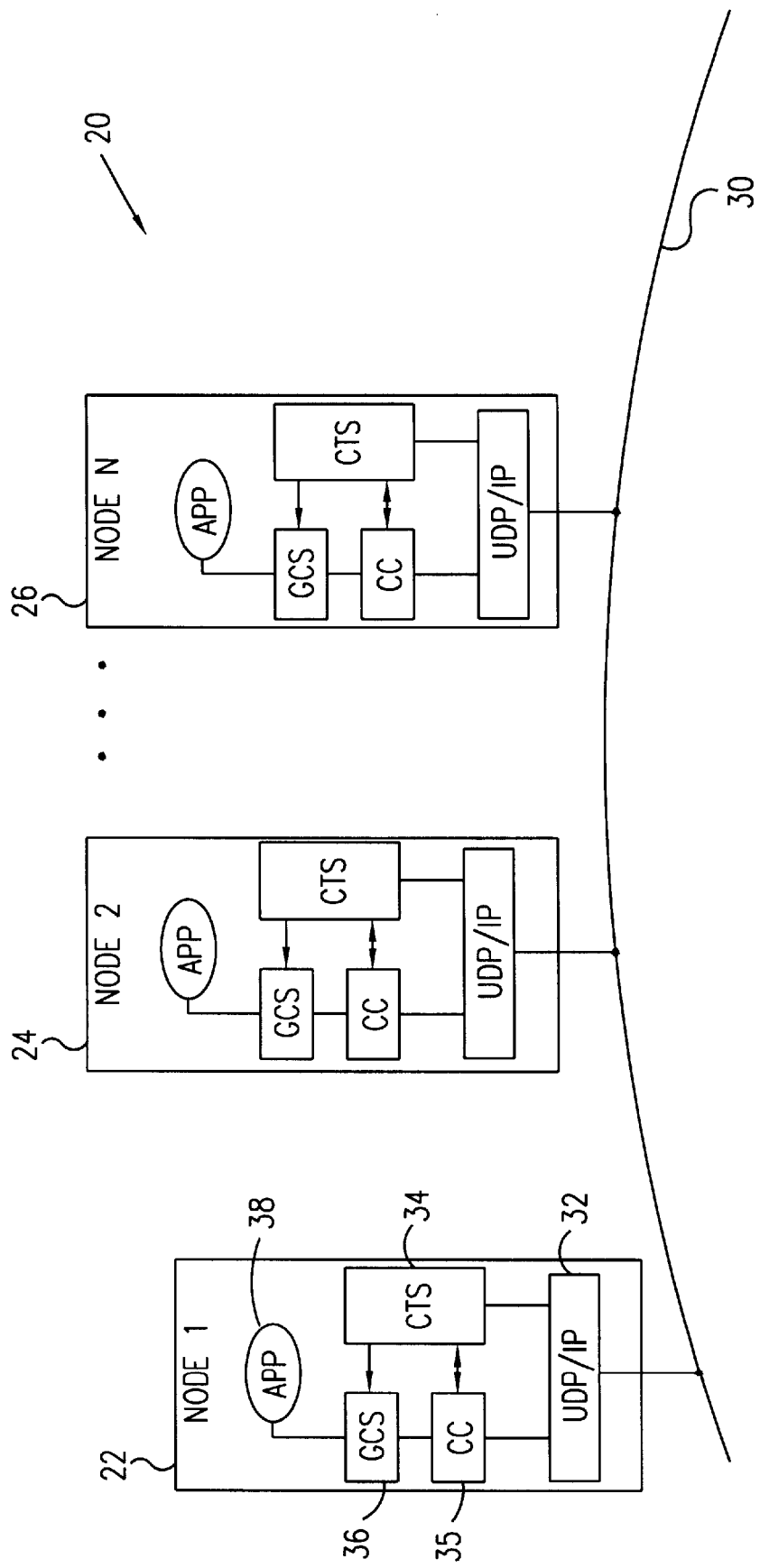
FIG. 1 is a block diagram that schematically illustrates a group of computing nodes linked by a network, in accordance with a preferred embodiment of the present invention.

FIG. 1 is a block diagram that schematically illustrates a distributed computing group 20, comprising a plurality of computing entities, or members 22, 24, 26, . . . , in accordance with a preferred embodiment of the present invention. Typically, as shown in the figure, each member is identified with a respective computing node in a cluster of nodes linked by a network 30. The nodes preferably comprise IBM AS/400 computers, running the OS/400 operating system, which includes a GCS middleware layer 36. Network 30 preferably comprises a local area network (LAN) or switch fabric, which most preferably operates in accordance with the Internet Protocol (IP). Alternatively, any other suitable types of nodes, network, operating system and GCS that are known in the art of distributed computing may be used.

Each of members 22, 24, 26, . . . , runs an instance of a software application 38, such that operations of the application are distributed among the members. GCS 36 provides facilities that support such distributed operation, including guaranteed distribution of messages among the members, as is known in the art, and reporting on membership changes in the group of members running the application, as described hereinbelow. The GCS ensures that all of the group members receive consistent membership change messages (as well as other multicast messages) in the same order. A communication layer 32, typically running a UDP/IP protocol, as is known in the art, is responsible for reliable messaging among the nodes. A cluster communications (CC) layer 35 provides reliable messaging service, ensuring that all multicast messages within the group reach all of the group members (so long as there is no system failure). A cluster topology services (CTS) layer 34 detects changes in the network and in the liveness of the various nodes, using services provided by communication layers 32 and 35. The operation of these layers, in the context of detecting and reporting on group configuration changes, is described in greater detail hereinbelow.

Software for application 38, GCS 36 and other protocol layers is typically distributed to the nodes over network 30. Alternatively, the software may be supplied on tangible media, such as CD-ROM, for installation on the nodes. Further aspects of GCS 36 are described in a U.S. pending patent application Ser. No. 09/456,682 entitled "Middleware Support for Primary Component in a Partitionable Cluster Environment," filed Dec. 9, 1999, and in a U.S. pending patent application Ser. No. 09/472,681 entitled, "Ordered Sub-Group Messaging in a Group Communications System," filed Dec. 30, 1999, both of which are assigned to the assignee of the present patent application, and whose disclosures are incorporated herein by reference.

Figure 2:
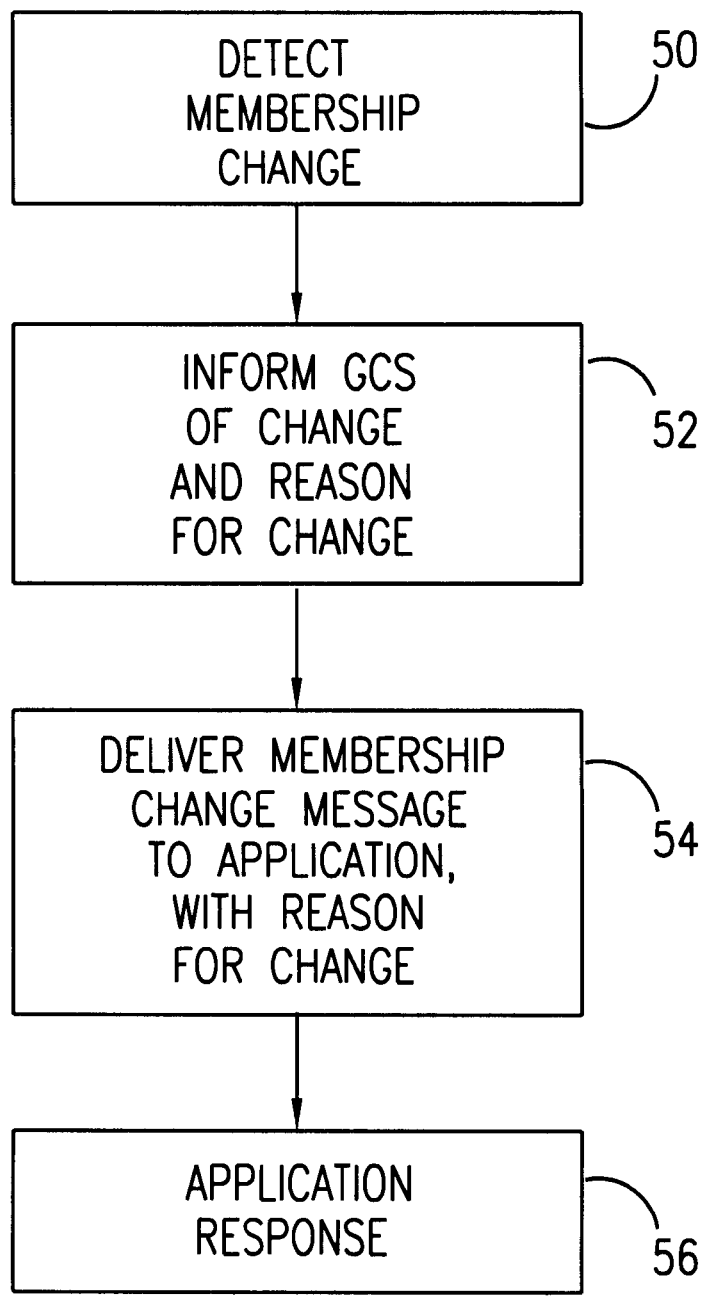
FIG. 2 is a flow chart that schematically illustrates a method for providing membership change messages for use by a group computing application, in accordance with a preferred embodiment of the present invention.

FIG. 2 is a flow chart that schematically illustrates a method for supplying membership change messages in cluster 20, in accordance with a preferred embodiment of the present invention. At a detection step 50, a membership change is detected by one of the components of the group. The detecting component may comprise substantially any element of cluster 20 that communicates with the GCS, or it may be the GCS itself.

The component passes the relevant membership change information, including the reason for the change, to the GCS at an inform GCS step 52. (When the GCS itself detects the change, however, step 52 is unnecessary.)

At a message delivery step 54, the GCS informs application 38, running on all of the members of the group, of the membership change, together with the reason for the change. The application is typically programmed to take action on the membership change, at an application response step 56, dependent on the type of change and reason for the change.

Because all live and connected members of the group receive the same membership change message, with the same reasons, the action taken by the application is consistent among all of the members. This consistency is generally broken only when the membership change involves a merge of two sets of nodes to form a single group, in which case the membership change messages to the two sets will be different, although symmetrical.

Table I below lists types of membership changes that are commonly encountered and reported upon by GCS 36. In each case, the table lists the reasons for the change, along with the component responsible for detecting the change. Further explanatory notes follow the table. It will be understood that the types of changes and their reasons listed in the table below are presented by way of example, and not limitation. Additional types and reasons for membership changes that can be detected and reported will be apparent to those skilled in the art.

TABLE I

| Type/reason for change | Detected by: | Resulting from: |
|---|---|---|
| Node/communication failure | Communication layer 32 | Detection of node or communication failure |
| Client liveness failure | GCS 36 | Failure in liveness checking method |
| Voluntary leave | Departing member (application 38) | Member leaving the group |
| Joining member | New member (application 38) | New member joining the group |
| Administrative expulsion | Administrator | Administrative decision |
| Group member damage | GCS 36 | Internal failure of member No response to GCS message |
| GCS damage | GCS 36 | Failure of GCS component on a node |
| Joining node | CTS layer 34 | New node discovered Attempt to re-merge after partition, for example, network reconnection |
| Invalid | GCS 36 | Several concurrent events, single reason cannot be given Default, not covered by other reasons |

As noted in the table above, at step 50, communication layer 32 detects errors in delivery of messages over network 30. Such errors are indicative of link failures or node failures, as the result of which one or more members of the group may become unreachable by the others. At step 52, the communication layer reports the failure to GCS 36. The GCS reports the resultant change to the remaining members of the group at step 54, with the reason NODE_OR_COMM_FAILED given for each unreachable member.

In operation of cluster 20, CTS layer 34 is responsible for detecting changes in the network and in the liveness of the nodes, typically by exchanging "are you live?" queries and replies among the nodes. When a node fails to respond to a liveness check, the CTS layer informs the GCS, which generates a membership change message accordingly. In this case, the reason given is failure of liveness of one or more of the nodes.

GCS 36 provides an application interface to application 38, which requires the application instance on any given member to inform the GCS of its reasons for joining or leaving the group. (This interface is also used to deliver the membership change messages at step 54.) Thus, in the case of a member voluntarily leaving or wishing to join the group, it is application 38 that provides the reason for the membership change at step 50.

Nodes may also be removed from the cluster by intentional action of a system administrator. This may occur, for example, for purposes of maintenance or repair. In this case, the GCS is informed of the administrative expulsion of the relevant member or members and notifies the members remaining in the group of the change.

Various types of membership changes are detected by the GCS itself. For example, the GCS detects an internal failure of one of the group members when that member does not respond to a GCS message. As another example, the GCS maintains, for each member, a table of information essential to processes in the group, such as the status of its communication queues. A GCS failure is detected if any of this information is lost, or if a member presents an internal state mismatch to the state indicated in the table. It may also occur that the GCS component itself fails on one of the nodes in the cluster, so that GCS messages cannot be conveyed to the member. In such cases, the reason given to the other members for the membership change is GCS failure.

The CTS layer is responsible for detecting new nodes that become accessible to the group, for any of a variety of reasons, such as those listed in the table above. In this case, the membership change message will carry the reason JOINING_NODE for each newly-detected member joining the group. An important distinction is made in the message between a new member joining the group and a re-merge into the group of one or more members that had been in the group previously but were separated from it, for example, by a network fault. The new member must receive a complete account of all information relating to the state of application 38. On the other hand, a re-merging member needs only to receive an update on the state information that may have changed while the member was disconnected from the group. The distinction between these two types of joining nodes is made possible by the inclusion of the membership change reasons in the message.

When the reason for a membership change cannot be clearly identified as belonging to a predefined category, such as those listed in the table, GCS 36 falls back on a default, "INVALID" reason for the change. Similarly, when failures cascade, and several reasons lead to the same change, the GCS preferably informs the group members of an INVALID membership change. Alternatively, the GCS may choose one of the several reasons, either arbitrarily or based on predetermined selection criteria.

The response of the application to the membership change, at step 56, typically varies depending on the reason for the change. In some applications, the dependence of the response on the reason may be crucial. For example, in a replicated database application, it may occur that a particular member responsible for maintaining the primary replica of the database (from which other replicas are copied) leaves the group. If GCS 36 informs the other members at step 54 that the particular member has left the group voluntarily, then another replica of the database can simply be appointed as the new primary replica. On the other hand, if the particular member has become detached from the group due to a network error, it may continue to function as the primary replica even while detached. In this case, at step 54, the GCS informs the remaining members that the group membership change is a result of a network fault. Consequently, at step 56, the members must first take precautions against inconsistencies arising in the database before they appoint a new primary replica and continue with normal operation. Application 38 is programmed with the appropriate responses to these different types of membership changes. In the absence of GCS messages giving the reasons for such membership changes, the application would not be able to distinguish between the different situations.

Similarly, the membership change message can be used by application 38 to determine the application state of members joining a group. This information is important in applications in which the group members maintain a common state, such as in cluster management applications, which track and inform users of the resources that are available to the group members in the cluster. In such applications, the current state of the group must be transferred to the members joining the group. As noted above, there are substantial differences in such state transfer between cases in which the joining members are new members, and cases in which the group is merged.

Although preferred embodiments described herein are based on GCS 36, it will be understood that the principles of the present invention may similarly be implemented, mutatis mutandis, in substantially any distributed computing environment in which there is a mechanism for membership tracking and delivery of membership change messages. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for controlling operation of a computer software application running on a plurality of computing nodes, which are members of a group of mutually-linked computing nodes running the application within a distributed computing system, the method comprising:

receiving an indication of a change in membership of the group together with a reason for the change; and delivering a membership change message to the members, so as to inform the members of the change and of the reason for the change.

2. A method according to claim 1, wherein the indication is received by group communication system middleware, which delivers the membership change message to the members.

3. A method according to claim 2, wherein receiving the indication of the change comprises detecting a failure of the group communication system at one of the nodes in the distributed computing system.

4. A method according to claim 1, wherein receiving the indication of the change comprises discovering a topology change in the distributed computing system.

5. A method according to claim 4, wherein discovering the topology change comprises detecting a node among the plurality of computing nodes in the system that has become available to run the application in the group.

6. A method according to claim 5, wherein detecting the node that has become available comprises determining whether or not the node was previously separated from the group, and wherein delivering the message comprises informing the members as to whether or not the node previously belonged to the group.

7. A method according to claim 1, wherein receiving the indication comprises receiving notice of a communication failure in a network linking the computing nodes.

8. A method according to claim 1, wherein receiving the indication comprises receiving notice of a failure of a node among the plurality of computing nodes in the distributed computing system.

9. A method according to claim 8, wherein receiving the notice of the failure of the node comprises receiving a report of a failure in a check to determine whether the node is functioning and able to perform a part in running the application.

10. A method according to claim 1, wherein receiving the indication comprises receiving notice that a new member has joined the group.

11. A method according to claim 1, wherein receiving the indication comprises receiving notice that one of the members has left the group voluntarily.

12. A method according to claim 11, wherein delivering the membership change message comprises notifying the other members that the one of the members has left the group voluntarily.

13. A method according to claim 1, wherein delivering the membership change message comprises notifying the members that one or more members have left the group due to a specified failure in the system.

14. A method according to claim 1, wherein delivering the membership change message comprises notifying the members that one or more members, previously separated from the group, have re-merged with the group.

15. A method according to claim 1, wherein delivering the membership change message comprises delivering the same message to all of the members of the group.

16. A method according to claim 15, wherein all of the members respond to the message in a mutually-consistent fashion.

17. Distributed computing apparatus, comprising:

a computer network; and a plurality of computer nodes, which are members in a group of the computing nodes that are mutually-linked by the network so as to run a computer software application, and which are adapted so that responsive to an indication received at one of the nodes of a change in membership of the group, a membership change message is delivered to the members via the network, informing the members of the change and of a reason for the change.

18. Apparatus according to claim 17, wherein the indication is received and the membership change message is delivered by group communication system middleware running on the nodes.

19. Apparatus according to claim 18, wherein the group communication system middleware delivers the same membership change message to all of the nodes.

20. Apparatus according to claim 17, wherein the reason for the membership change is a communication failure in the network.

21. Apparatus according to claim 17, wherein the reason for the membership change is a failure at one of the nodes.

22. Apparatus according to claim 17, wherein the reason for the membership change is a voluntary change in the membership status of one of the nodes.

23. Apparatus according to claim 17, wherein all of the nodes respond to the message in a mutually-consistent fashion.

24. A computer software product for controlling operation of an application running on a plurality of computing nodes, which are members of a group of mutually-linked computing nodes running the application within a distributed computing system, the product comprising a computer-readable medium in which computer program instructions are stored, which instructions, when read by the computing nodes, cause at least one of the nodes to receive an indication of a change in membership of the group together with a reason for the change, and to deliver a membership change message to the members, so as to inform the members of the change and of the reason for the change.

25. A product according to claim 24, wherein the product comprises group communication system middleware.

26. A method for controlling operation of a computer software application run by a plurality of computing processes, which are members of a group of processes running on mutually-linked computing nodes within a distributed computing system, the method comprising:

receiving an indication of a change in membership of the group together with a reason for the change; and delivering a membership change message to the members, so as to inform the members of the change and of the reason for the change.

* * * * *